A. E. FEWELL.
BREAD CUTTING MACHINE.
APPLICATION FILED OCT. 12, 1918.
1,317,690.
Patented Oct. 7, 1919.
3 SHEETS—SHEET 3.
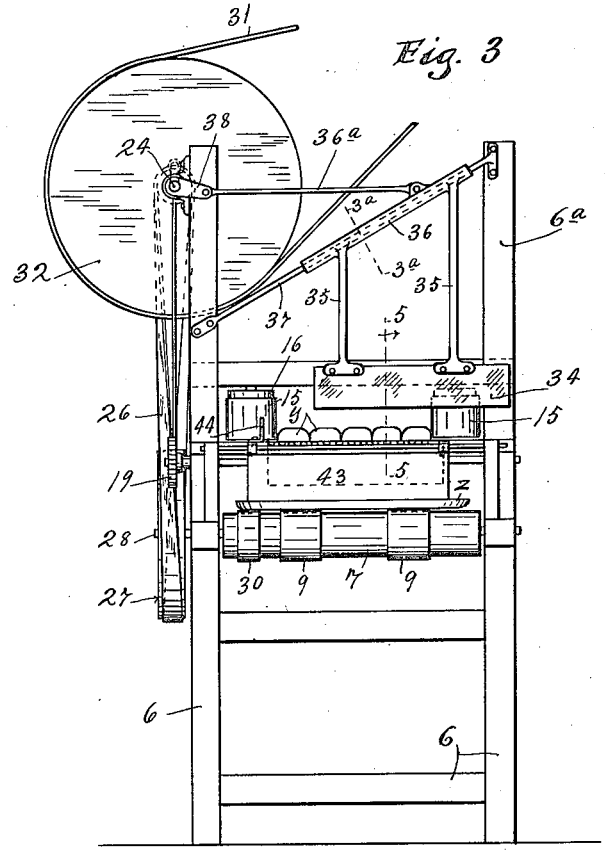
Fig. 3
Fig. 3ᵃ
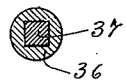
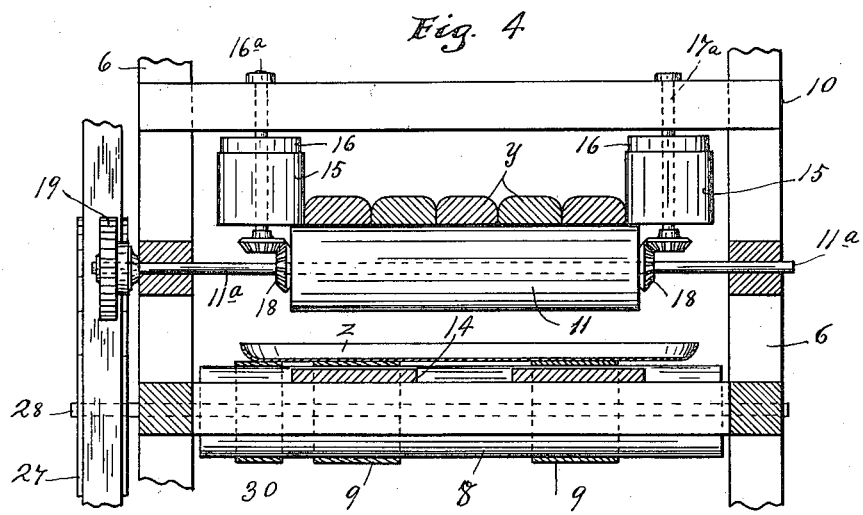
Fig. 4
WITNESSES.
H. L. Opsahl.
A. H. Opsahl.
INVENTOR.
A. E. FEWELL
BY HIS ATTORNEYS.
Williamson & Merchant

UNITED STATES PATENT OFFICE.

ALBERT E. FEWELL, OF MINNEAPOLIS, MINNESOTA, ASSIGNOR OF ONE-HALF TO LOUIS F. BOLSER, OF MINNEAPOLIS, MINNESOTA.

BREAD-CUTTING MACHINE.

1,317,690.     Specification of Letters Patent.     Patented Oct. 7, 1919.

Application filed October 12, 1918. Serial No. 257,882.

*To all whom it may concern:*

Be it known that I, ALBERT E. FEWELL, a citizen of the United States, residing at Minneapolis, in the county of Hennepin and State of Minnesota, have invented certain new and useful Improvements in Bread-Cutting Machines; and I do hereby declare the following to be a full, clear, and exact description of the invention, such as will enable others skilled in the art to which it appertains to make and use the same.

My invention has for its object to provide a simple and efficient machine of very large capacity for slicing bread loaves; and to such ends, the invention consists of the novel devices and combinations of devices hereinafter described and defined in the claims.

It is a well known fact that toasted bread is baked and toasted at bakeries and commercially sold in large quantities. Bread loaves for the making of this toast should be uniformly cut, and, moreover, the cutting thereof in large quantities is an important matter in point of economy. My improved machine is adapted to cut uniformly and rapidly a multiplicity of loaves of bread, the feeding action and the cutting and the depositing of the slices in suitable trays, as well as the feeding of these trays in position to receive the cut slices, being done automatically.

The commercial form of this machine is illustrated in the accompanying drawings, wherein like characters indicate like parts throughout the several views.

Referring to the drawings;

Fig. 3 is an end elevation of the machine looking at the delivery end thereof;

Figure 2:
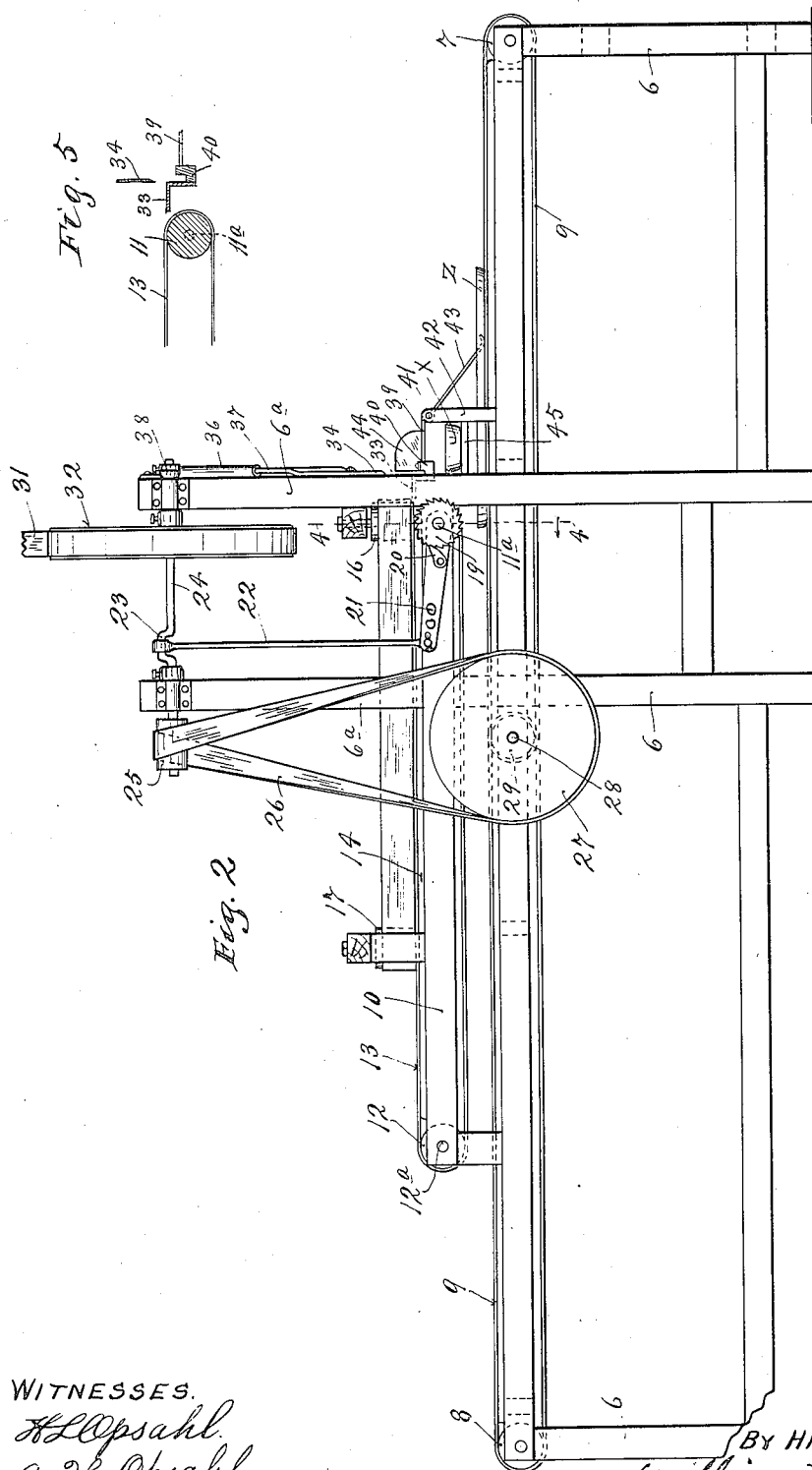
Fig. 2 is a side elevation thereof.

Fig. 3$^a$ is a section on the line 3$^a$—3$^a$ of Fig. 3;

Fig. 4 is a vertical section taken approximately on the line 4—4 of Fig. 2, some parts being shown in full, and some parts being broken away; and Fig. 5 is a vertical longitudinal section taken on the line 5—5 of Fig. 3.

The main frame 6 of the machine is shown as of a skeleton formation, and to the upper, front and rear corners thereof are journaled rollers 7 and 8. An endless tray feeding apron, as shown, made up of two laterally spaced belts 9, runs over the rollers 7 and 8. The frame 6 has an upwardly extended portion 6$^a$ that supports a horizontal supplemental frame 10. Front and rear rollers 11 and 12 have, respectively, shafts 11$^a$ and 12$^a$ journaled in the front and rear end portions of the supplemental frame 10; and an endless bread loaf carrying apron 13 runs over these rollers 11 and 12. Preferably, the upper horizontal portion of the endless apron or belt 13 runs over a horizontal deck 14 (see Fig. 2) supported by the supplemental frame 10. This apron 13 carries a plurality of loaves $y$ on its upper surface and the edges of the outer loaves are arranged to run against upright guiding and pressing belts 15 that run over front and rear upright rollers 16 and 17, respectively.

These rollers 16 and 17 have shafts 16$^a$ and 17$^a$, respectively, that are journaled in overlying beams of the supplemental frame 10. The shafts 17$^a$ of the front rollers 16 are connected to the shaft 11$^a$ of the front horizontal roller 11 by miter gears 18 (see Fig. 4), so that the said rollers 16 are driven in synchronism with the roller 11.

The loaf carrying apron or belt 13 is arranged to be intermittently driven, each step of movement thereof being equal to the thickness of the desired slice of the bread. As a simple means for imparting this intermittent movement, a ratchet wheel 19 (see Fig. 2) is secured to one projecting end of the roller shaft 11$^a$ and is subject to a dog 20 carried by a lever 21, which lever is loosely pivoted on said shaft 11$^a$. A link 22 connects the free end of ratchet lever 21 to the crank 23 of a crank shaft 24 journaled in suitable bearings on the upper frame structure 6$^a$. The free end of lever 21, it will be noted, has a plurality of perforations, through any one of which the end of link 22 can be passed so as to thereby vary the throw of lever 21, and consequently, the extent of the step of movement imparted to the loaf feeding belts or aprons, for each rotation of the crank shaft 24. This crank shaft 24, at its rear end, has a small pulley 25 and a belt 26 is run over this pulley and over a larger pulley 27 that is secured to one projecting end of a roller shaft 28. This pulley shaft 28 is journaled in one side of the frame 6 and is provided with a pulley 29 (see Figs. 1 and 2). A belt 30 runs over the pulley 29 and over one end portion of the front horizontal roller 7 of the tray conveyer. By the connections above described, motion will be transmitted from crank shaft 24 to the tray conveying apron and to the loaf conveying belts or aprons, but the motion imparted to the latter will be intermittent while the motion imparted to the former will be a continuous movement. The two movements, however, will be relatively timed, as hereinafter noted. Motion may be imparted to the crank shaft 24 and from thence to all of the moving parts of the machine, through a power driven belt 31 that runs over a pulley 32 on the crank shaft 24.

Figure 1:
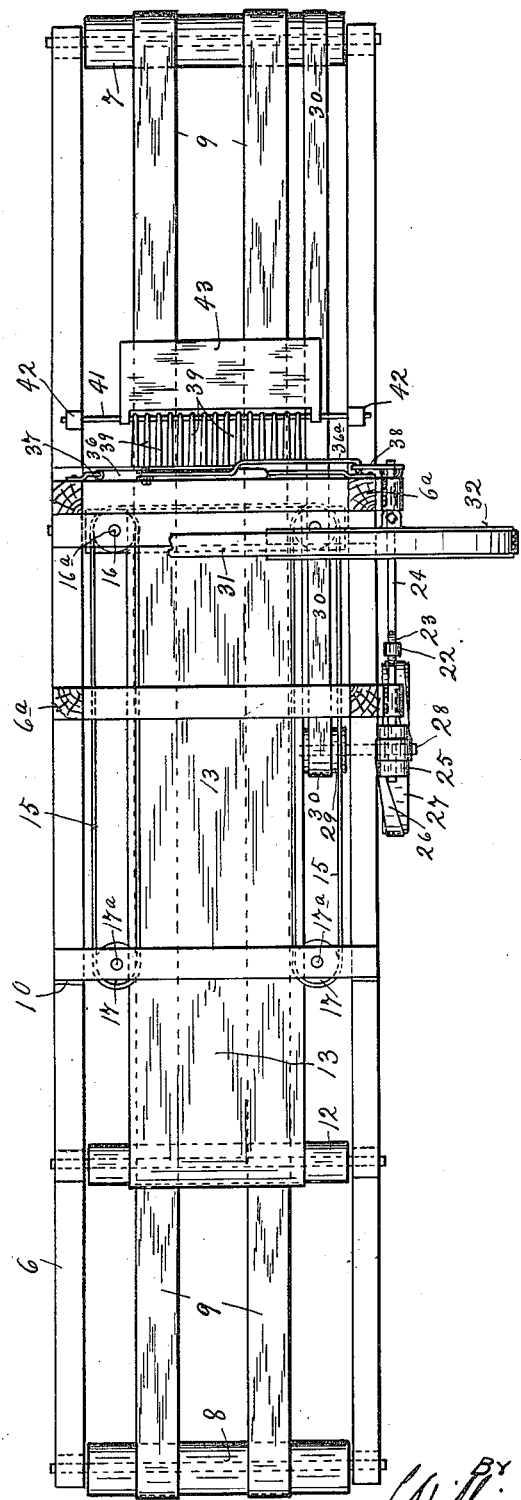
Figure 1 is a plan view of the improved machine.

Shallow, but wide trays z are adapted to be placed on the rear portion of the apron 9, and by said apron will be carried forward, or from the left toward the right, in respect to Figs. 1 and 2, and under the belt 13. Here it will be noted that the under tray conveyer apron 9 extends at the rear and at the front, beyond the rear and front ends of the loaf conveying apron 13.

Just in front of the front roller 11 is a shearing bar 33, shown as of angular form set with one flange, vertically, and with the whole horizontally alined with the top of conveyer 13, so that the loaves of bread will be fed smoothly over the same. Coöperating with the shearing bar 33 and serving to simultaneously slice the several loaves of bread presented thereto, is a long and sharp horizontally disposed knife blade 34 that is mounted for compound vertical and edgewise movement in a vertical plane, so that it is caused to operate with a drawing cut. To give this movement to the blade, it is shown as provided with upwardly extended arms 35 secured to an oblique transverse sleeve 36 that is mounted to slide on an oblique guide rod 37, the ends of which are secured to the front portion of the upper frame structure 6ª.

As a means for preventing rotation of sleeve 36 on guide rod 37, said rod and the interior of said sleeve may be made to run in cross section, as best shown in Fig. 3ª. This, as is evident, will prevent the blade 34 from swinging laterally out of its proper operating plane.

Reciprocating movement is imparted to the sleeve 36 through a link or connecting rod 36ª attached thereto at one end and, at its other end, connected to a crank 38 carried by the front end of shaft 24. The sleeve 36, with its arms 35 afford a sort of obliquely movable crosshead for carrying the knife; and, as is evident, the knife is thus operated through the heretofore described shaft 24.

As the slices of bread are cut from the loaves, they will fall onto a so-called grate or open deck 39, which, as shown, is made up of a plurality of laterally spaced fingers or rods supported at their rear ends by a transverse bar 40 and at their front ends by a transverse rod 41. The bar 40 is supported at its ends from the upper frame structure 6ª, while the rod 41, at its ends, is supported by posts 42 on the upper side rails of the main frame 6.

The numeral 43 indicates an inclined slice discharge deck that is pivotally mounted on the rod 41 with its free end arranged to maintain contact with the trays z when the latter are carried under the same.

Preferably, laterally spaced upright guide plates 44 are secured to the end portions of the bar 40 to assist in guiding the cut slices over the grate 39 and onto the delivery deck 43.

Crumbs or small broken pieces of bread fall through the grate 39 and will be caught by a tray or waste basket x, which, as shown, is supported just below said grate on a small shelf 45 that is located above the line of movement of the trays z and is suitably attached to the upper frame structure 6ª, or any other suitable support.

Summarized, the operation is as follows:

Loaves of bread will be properly placed on the rear portion of the belt 13, to wit, at the left hand portion, as shown in Figs. 1 and 2, and they will be carried forward of the said belt 13 and coöperating side belts 15. The empty trays will be placed on the rear portion of belt 9 and they will be fed forward under the belt 13 and under the crumb tray 45, and the inclined delivery deck 43. As already stated, the movement of the belts 13 and 15, will be intermittent, one step of movement being given thereto for each rotation of crank shaft 24.

The knife operates to slice the bread during the intervals of rest of the belts 13 and 15. The crumbs will drop through the grate 39 into the crumb tray 45, while the severed slices will, by the progressive movement of the bread, be forced over the grate, and until they reach the inclined deck 43, by which they will be delivered into an alining tray. The trays on the belt 9 will be placed edge to edge, so that there will always be a tray in position to receive the belt slices. An attendant will, of course, handle these trays and supply the bread loaves. The machine, in practice, has been found highly efficient for the purposes had in view.

What I claim is:

1. A machine for slicing bread loaves comprising an endless loaf feeding apron, means for intermittently moving the same, a slicing knife operative at one end of said apron, knife actuating means timed to cut the slices during the interval of rest of said apron, a grate below said knife, and a crumb tray below said grate.

2. A machine for slicing bread loaves comprising an endless loaf feeding apron, means for intermittently moving the same, a slicing knife operative at one end of said apron, knife actuating means timed to cut the slices during the interval of rest of said apron, a grate below said knife, a crumb tray below said grate, and a pivoted inclined deck extended downward and forward from said grate.

3. A machine for slicing bread loaves comprising an endless loaf feeding apron, means for intermittently moving the same, a slicing knife operative at one end of said apron, knife actuating means timed to cut the slices during the interval of rest of said apron, a grate below said knife, a crumb tray below said grate, and a pivoted inclined deck extended downward and forward from said grate, and laterally spaced upright conveyer belts working above and at the sides of said loaf conveyer.

4. In a bread slicing machine, the combination with a framework and a power driven crank shaft mounted thereon, of a horizontally disposed endless loaf conveying apron and guides therefor on said frame, pawl and ratchet driving connection between said crank shaft and loaf conveying apron for intermittently moving the same, upright laterally spaced conveyer belts working above and at the sides of said loaf conveyer, a slicing knife mounted to move obliquely at the delivery end of said loaf conveying apron, means for reciprocating said knife from said crank shaft, a grate below said knife, a crumb tray below said grate, a horizontally disposed endless tray conveyer working below said loaf conveying apron and crumb tray and extended both at the front and rear portions beyond said loaf conveying belt, and connections for moving said tray conveyer from said crank shaft.

5. In a bread slicing machine, the combination with a framework and a power driven crank shaft mounted thereon, of a horizontally disposed endless loaf conveying apron and guides therefor on said frame, a variable throw pawl and ratchet driving connection between said crank shaft and loaf conveying apron for intermittently moving the same, upright laterally spaced conveyer belts working above and at the sides of said loaf conveyer, a slicing knife mounted to move obliquely at the delivery end of said loaf conveying apron, means for reciprocating said knife from said crank shaft, a grate below said knife, a crumb tray below said grate, a horizontally disposed endless tray conveyer working below said loaf conveying apron and crumb tray and extended both at the front and rear portions beyond said loaf conveying belt, and connections for moving said tray conveyer from said crank shaft.

In testimony whereof I affix my signature in presence of two witnesses.

ALBERT E. FEWELL.

Witnesses:
B. G. BAUMANN,
HARRY D. KILGORE.